United States Patent
Van Overschelde

(10) Patent No.: US 6,508,705 B1
(45) Date of Patent: Jan. 21, 2003

(54) GRAIN STORAGE TANK FOR AN AGRICULTURAL HARVESTER

(75) Inventor: Daniel M. G. Van Overschelde, Torhout (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/978,389

(22) Filed: Oct. 16, 2001

(30) Foreign Application Priority Data

Oct. 23, 2000  (GB) .............................................. 0025838

(51) Int. Cl.⁷ .......................... A01D 90/10; A01F 12/60
(52) U.S. Cl. .......................... 460/23; 460/119; 296/15; 296/26.07
(58) Field of Search ...................... 460/23, 119; 220/6, 220/7; 56/202, 28; 296/7, 13, 14, 15, 26.04, 26.06, 26.07

(56) References Cited

U.S. PATENT DOCUMENTS

| | | | |
|---|---|---|---|
| 2,720,413 A | * 10/1955 | Halverson | 296/10 |
| 4,466,549 A | 8/1984 | Hanaway | |
| 4,544,196 A | * 10/1985 | Schmeichel et al. | 254/129 |
| 4,960,300 A | * 10/1990 | Burvee | 296/26.07 |
| 5,151,064 A | * 9/1992 | Damman et al. | 460/119 |
| 6,082,570 A | * 7/2000 | Tai | 220/6 |
| 6,206,779 B1 | * 3/2001 | Gerber et al. | 460/119 |

FOREIGN PATENT DOCUMENTS

| | | |
|---|---|---|
| EP | 0819371 A! | 1/1998 |
| GB | 2296175 | 6/1996 |

OTHER PUBLICATIONS

"Huge Combine Bin Extension", Farm Show, vol. 15–5, 1991.*
"New Low Profile Combine Bin Extension", Farm Show, vol. 15–2, 1991.*
"'Doubled–up' Combine Bin Extension", Farm Show, vol. 14–1, 1990.*
"Fold–Down Bin Extension Fits Deere Combines", Farm Show, vol. 8–4, 1984.*

* cited by examiner

Primary Examiner—Thomas B. Will
Assistant Examiner—Nathan Mammen
(74) Attorney, Agent, or Firm—John William Stader; Larry W. Miller

(57) ABSTRACT

An agricultural harvester is provided with a grain tank affixed to its main frame for storing therein processed crop material. The volume of the grain tank can be extended by an extension assembly comprising a first pair of mutually opposed panels and a second pair of mutually opposed panels. The panels are movable between a lower, inoperative position and a higher, operative position in which the panels substantially increase the volume of the grain tank. The movement of the second pair is controlled by the movement of the first pair of panels. The panels are provided with locking mechanism for keeping all panels in their operative position and which are disposed to become engaged and to secure the extension assembly in the extended position when the first pair of panels moves the second pair of panels to their operative position.

6 Claims, 9 Drawing Sheets

GRAIN STORAGE TANK FOR AN AGRICULTURAL HARVESTER

BACKGROUND OF INVENTION

1. Field of Art

The present invention relates to agricultural harvesters, such as combine harvesters, having a storage tank for harvested crop material. More particularly, it relates to retractable extension means for temporarily extending the volume of said storage tank.

2. Description of Prior Art

Commonly, combine harvesters are provided with large capacity grain tanks for temporarily storing the harvested and cleaned grain before it is discharged, at appropriate intervals, into attendant vehicles or any other suitable receptacle. As the harvesting capacity of modern combines increases, there is a need for larger grain tanks. However, the possibilities for increasing the grain tank volume are not unlimited. Road transport regulations set limits to the maximum width and height of the vehicle. Furthermore, the space requirements for the crop processing apparatus below the grain tank tends to increase, thereby raising the lowest point available for grain storage.

In order to cope with this problem, the grain tank can be provided with a collapsible top portion, which is put down in a lower, inoperative position for road transport, and which is raised to a higher, operative position for harvesting operations. Such collapsible grain tank extensions are described in GB-A-2 296 175, U.S. Pat. No. 4,466,549 and EP-A-0 819 371.

It is required that the extended top portion be sturdy to hold large masses of grain, which are subject to forces in various directions resulting from the movement of the combine over the field. Still the grain tank extensions should be easy to lift and lower, to adapt quickly to alternating road and field conditions.

SUMMARY OF THE INVENTION

According to the present invention, there is provided an agricultural harvesting machine, having a wheeled main frame, a means for collecting and processing crop material from a field, a storage tank affixed to said main frame for storing therein said processed crop material; and an extension means associated with said storage tank. The extension means having a first pair of mutually opposed panels and a second pair of mutually opposed panels. The first and second pair of panels being movable between a lower, inoperative position and a higher, operative position in which said panels substantially increase the effective volume of said storage tank, the movement of the second pair being controllable by the movement of the first pair.

The panels of the first and second pairs are provided with locking means for keeping all panels in their operative position, said locking means being disposed to become engaged and to secure the panels in their operative position when said first pair of panels moves the second pair of panels to their operative position.

This interlocking feature of the grain tank panels provides for a sturdy tank extension, which is easily lowered or raised. Members, such as rollers, may be provided on the panels of the first pair for engaging the inner surface of the panels of the second pair during raising or lowering action. Advantageously, the panels of the second pair may have means for keeping the rollers against their inner surface, thereby preventing unwanted outward movement of these panels. This may be realised by a curved profile which is arranged along the path of the rollers.

To permit simultaneous erection of the panels of the first pair, they may be interconnected by transmission means, for example a rotatable transmission shaft which is connected by rods to these panels. The rods may be connected to the shaft at points having a different distance to the rotation axis, thereby permitting loading of the one panel before the other panel is loaded.

The processed crop is discharged into the tank by an elevator which advantageously has a movable portion which can lowered below the top level of the closed tank. A rod connecting the movable portion to one of the panels provides for automatically bringing the elevator into its active position when the tank extension is raised.

When the machine is provided with a controller like a microprocessor, for controlling the actuator which moves the panels between their operative and inoperative positions, and a grain tank level indicator, the controller can be used to prevent retraction of the actuator to close the extensions in case the indicator senses a grain tank level above a predetermined level. In this manner inadvertent closing of a filled grain tank and subsequent damage to the actuator and/or panels is precluded.

BRIEF DESCRIPTION OF THE DRAWINGS

An agricultural harvesting machine in accordance with the present invention will now be described in greater detail, by way of example, with reference to the accompanying drawings.

DETAILED DESCRIPTION OF THE INVENTION

The terms "grain", "straw" and "tailings" are used principally throughout this specification for convenience at it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
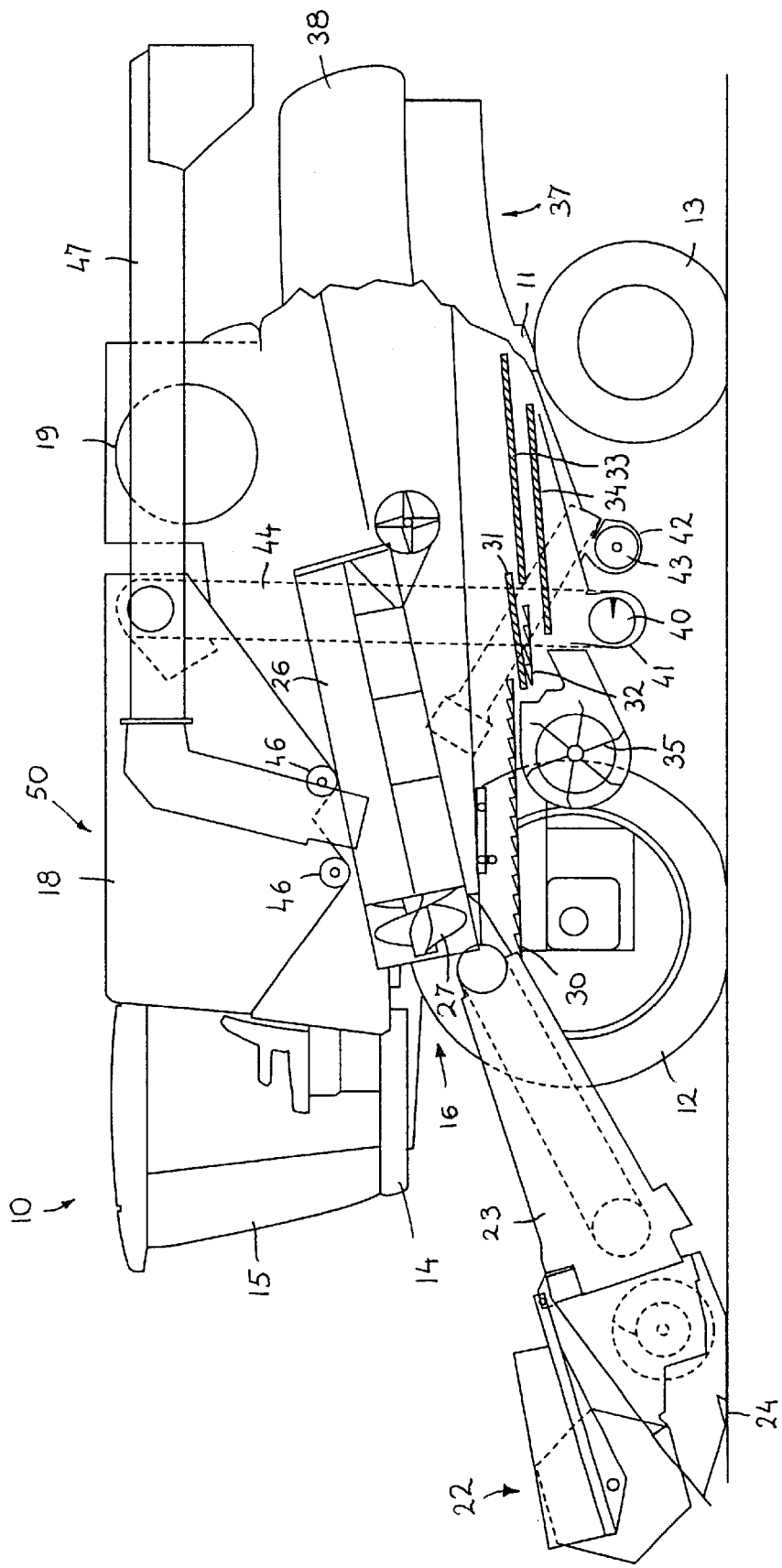
FIG. 1 is a diagrammatic, partly sectional side elevation of a combine harvester comprising a grain storage tank.

The combine harvester 10 illustrated in FIG. 1 of the accompanying drawings, is of the axial-flow type, wherein crop material is threshed and separated while it is advanced by and along a longitudinally arranged rotor. However, the invention may also be applied to a so-called conventional harvester wherein the threshed crop is separated from the straw by a set of juxtaposed straw walkers. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional grain header 22 and straw elevator 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22, whereafter the header and the straw elevator 23 supply the cut crop to the threshing and separating assembly 16.

The threshing and separating assembly 16 comprises at least one generally cylindrical chamber 26 in which a rotor 27 is rotated to thresh and separate the crop received therein, that is to say, the crop is rubbed and beaten between the rotor 27 and the inner surface of the chamber 26, whereby the grain, seed or the like, is loosened and separated from the straw.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 and a bubble-up auger 45 to the grain tank 18. Tailings fall to a tailings auger (not shown) in a tailings auger trough 42. The tailings are transported sideways by said tailings auger to a separate rethresher 43 and returned by a tailings conveyor to the cleaning assembly 17 for repeated cleaning action.

A pair of grain tank augers 46 at the bottom of the grain tank 18 can be rotated to urge the clean grain sideways to an unloading tube 47 for discharge from the combine harvester 10.

Figure 2:
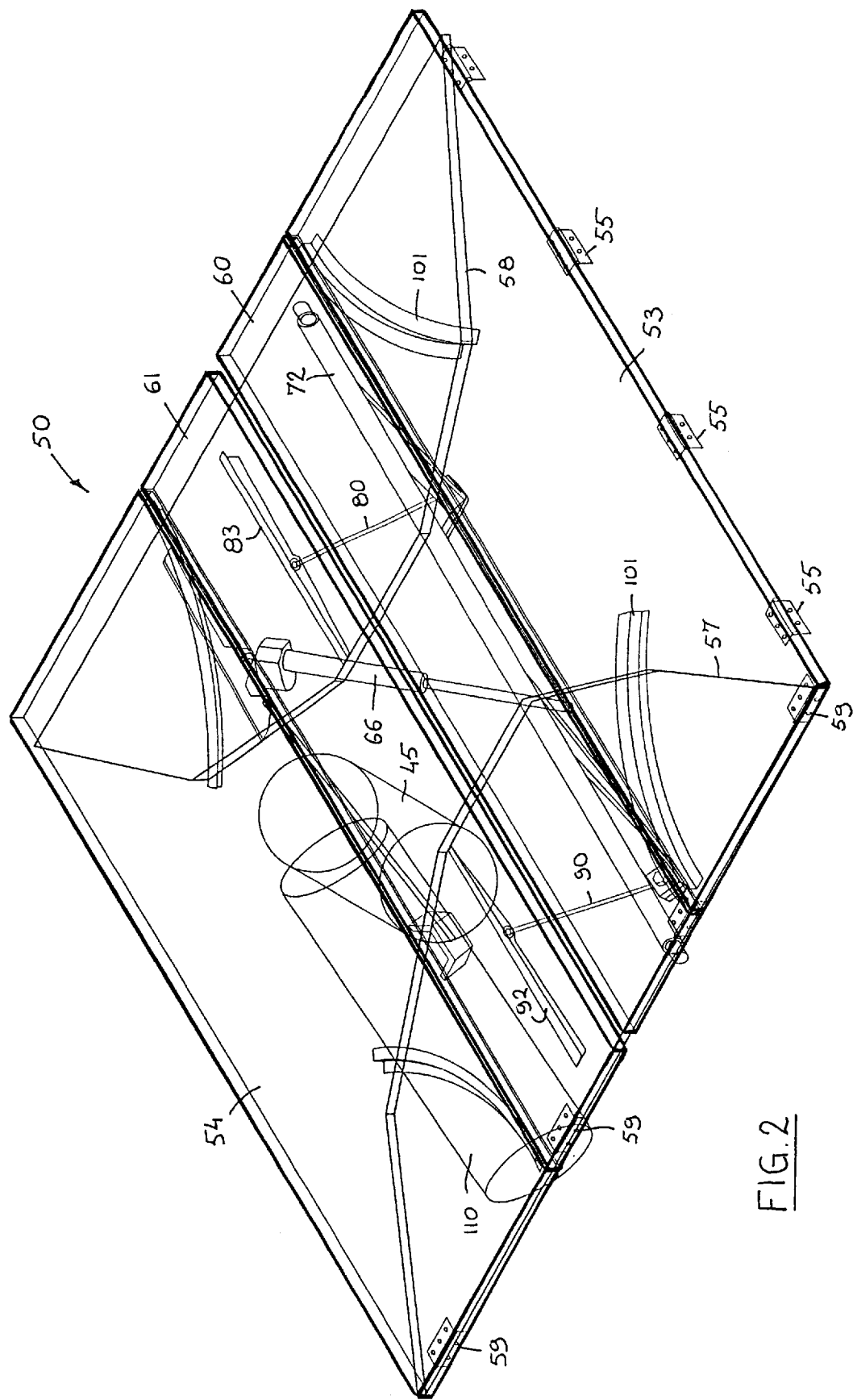
FIG. 2 is a perspective view of the top of the tank of FIG. 1, showing a grain tank extension in its collapsed, inoperative position.
Figure 3:
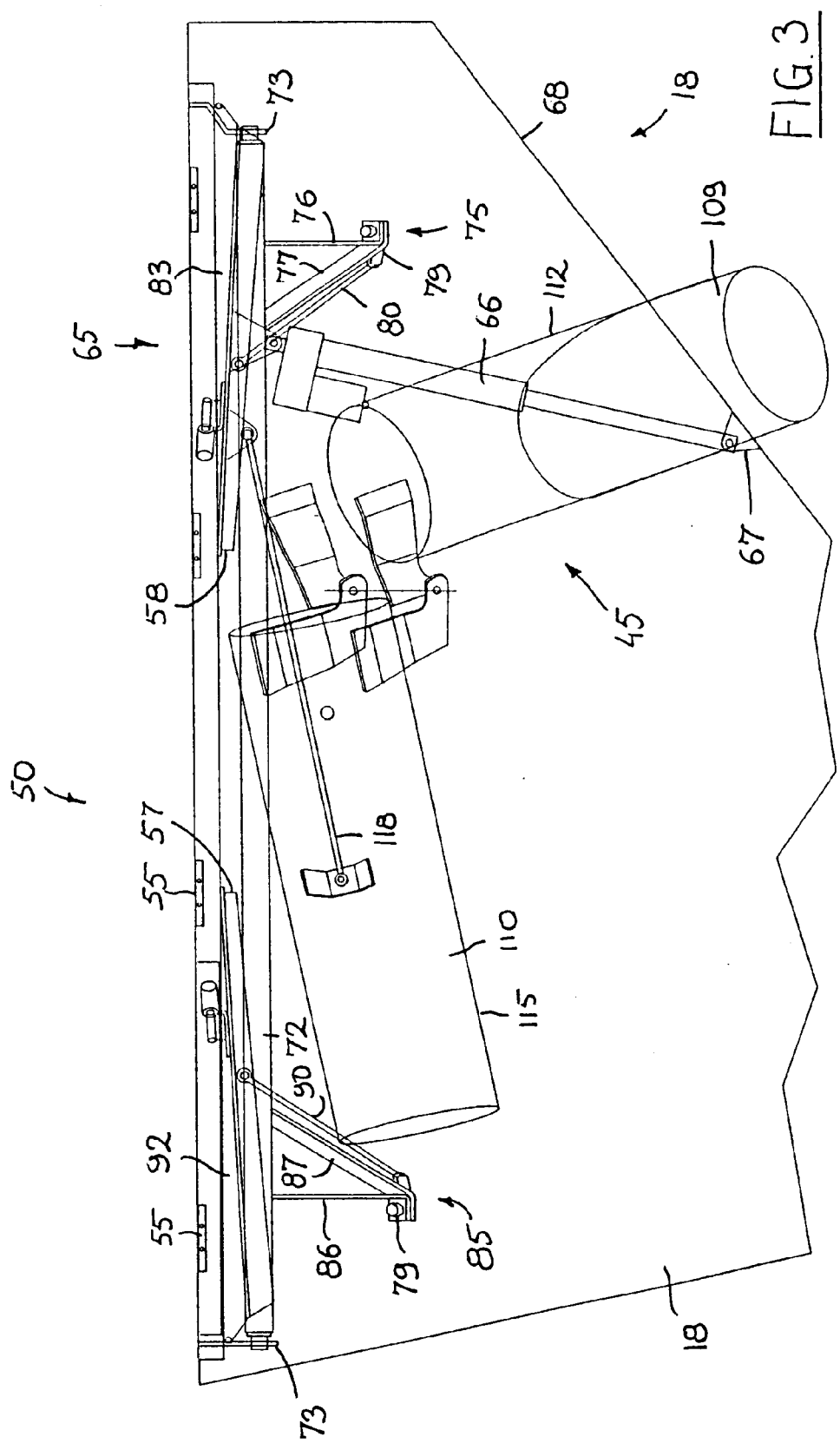
FIG. 3 is a longitudinal sectional view of the grain tank and the extension of FIG. 2.
Figure 4:
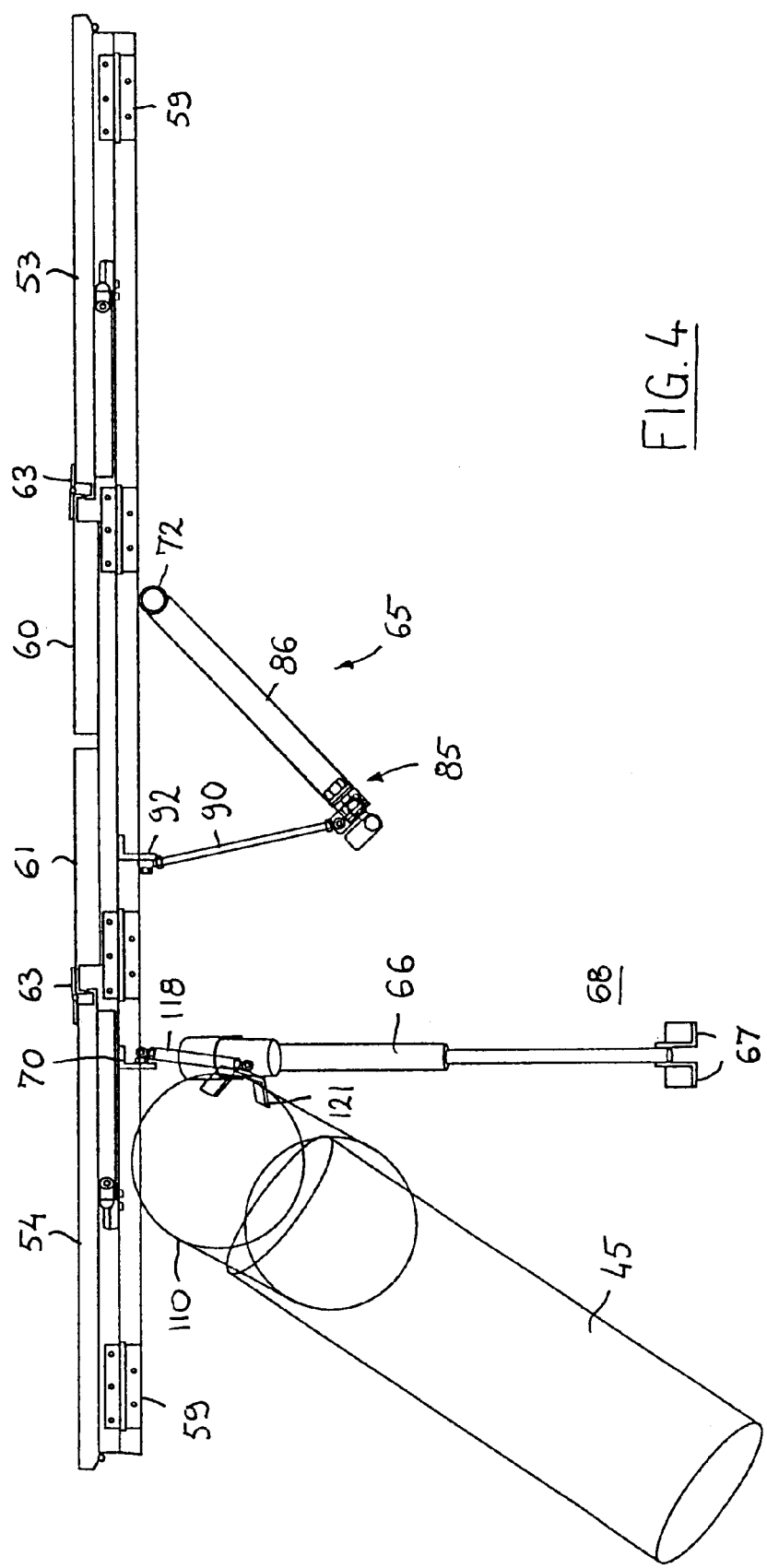
FIG. 4 is a cross sectional view of the extension of FIG. 2.
Figure 5:
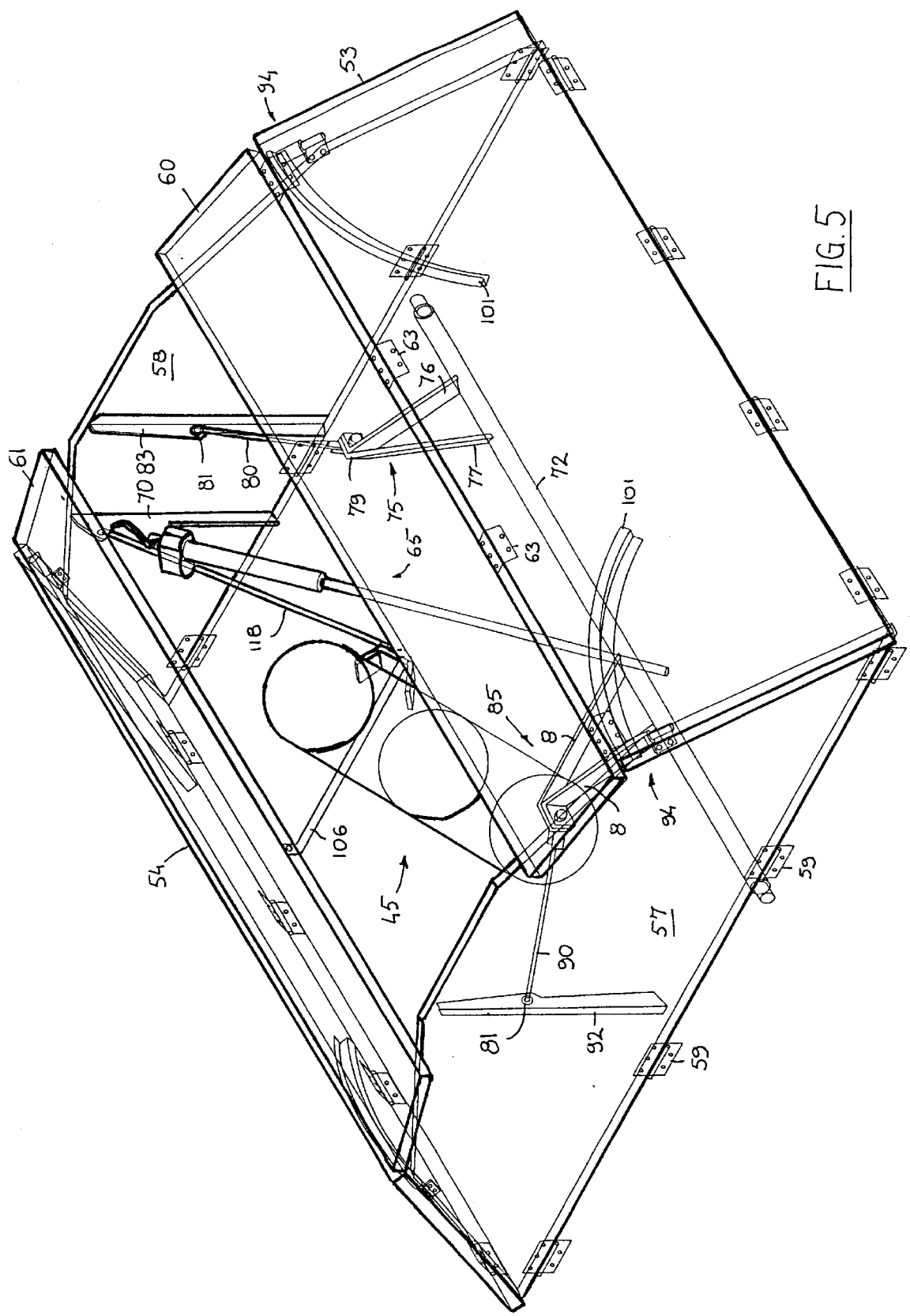
FIG. 5 is a perspective view of the top of the grain tank, showing the extension in its erected, operative position.
Figure 6:
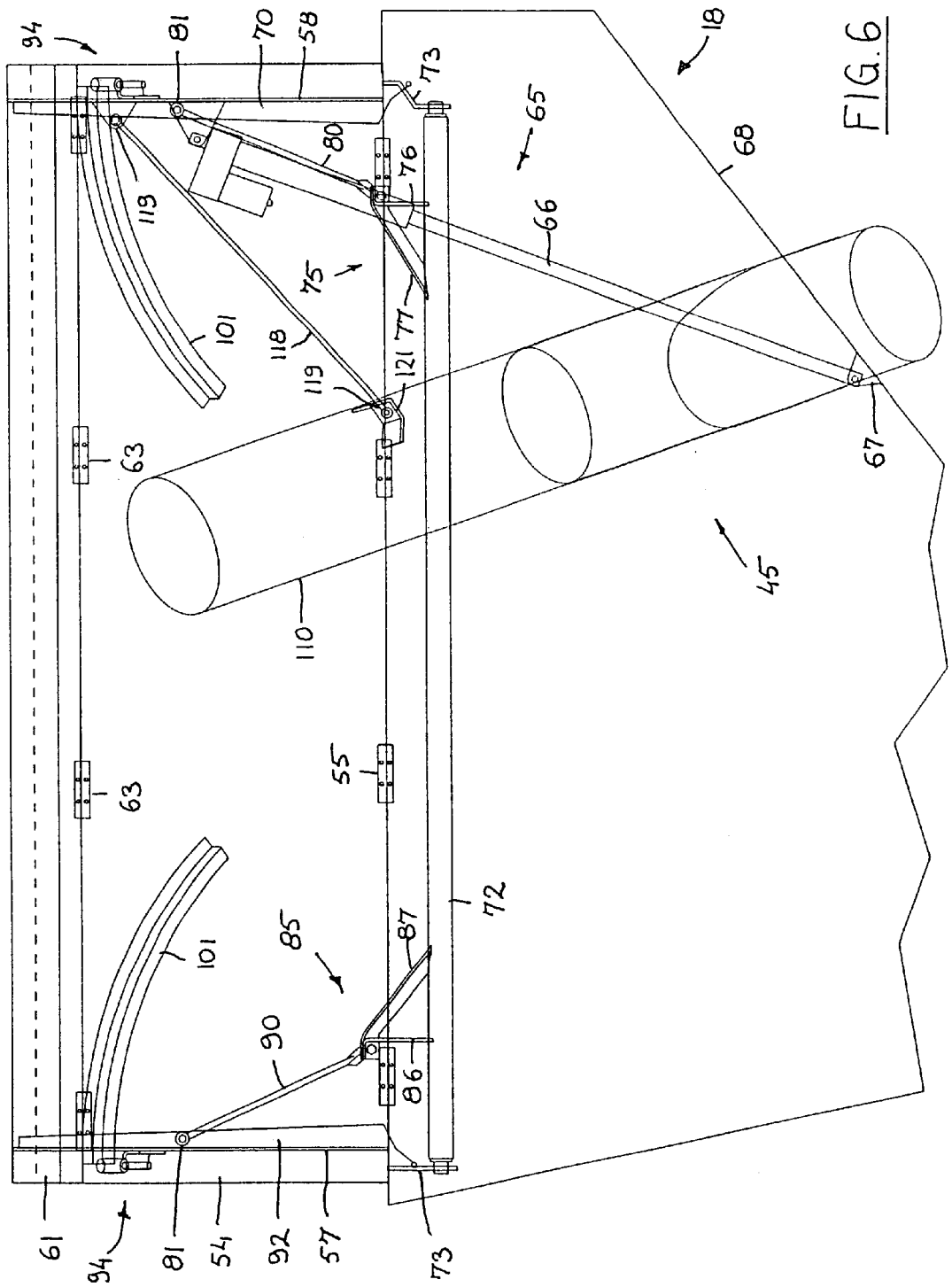
FIG. 6 is a longitudinal sectional view of the grain tank and the extension of FIG. 5.
Figure 7:
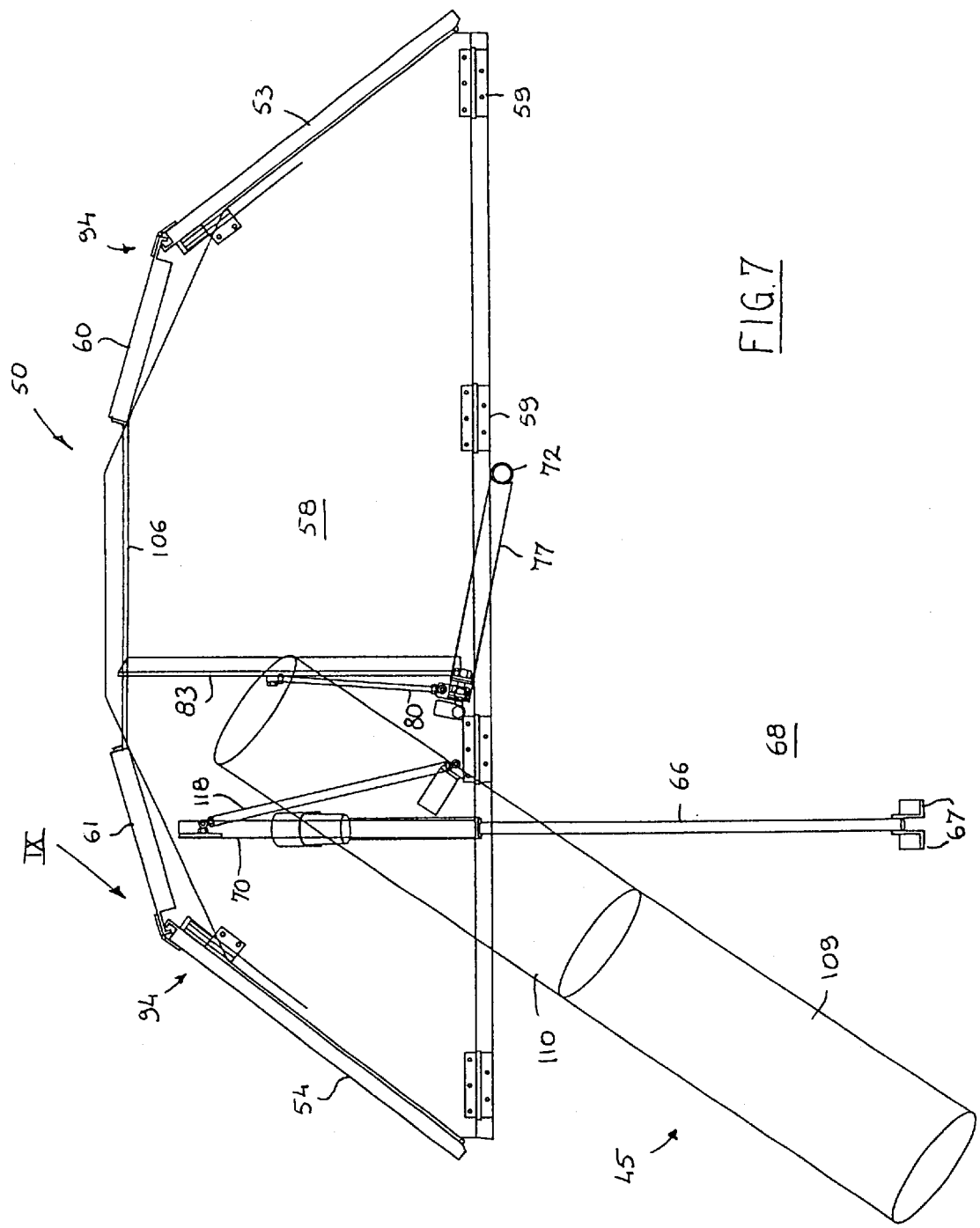
FIG. 7 is a cross sectional view of the extension of FIG. 5.

The grain tank 18 has at its top a quadrangular opening, which is provided with a collapsible grain tank extension assembly 50. In its collapsed position, the extension assembly 50 closes the top of the grain tank as shown in FIGS. 2–4. In its upright position, as illustrated by FIGS. 5–7, it provides for a substantial increase in volume of the grain tank 18.

The assembly 50 comprises a pair of side panels 53, 54, which are connected by hinge means, for example a series of hinges 55, to the left and right borders of the opening of the grain tank 18, and a pair of end panels 57, 58, which are connected by further hinge means, e.g. a series of hinges 59, to the front and rear border, respectively, of this opening. The side panels 53, 54 are generally rectangular in shape and the front and rear panels 57, 58 have a generally trapezoidal shape, with their longest, base side connected by the hinges 59 to the grain tank 18.

The extension assembly 50 further comprises a pair of cover panels 60, 61 which are linked by hinges 63 to the inner borders of the left and right side panels 53 , 54 respectively. In their collapsed position, the side panels 53, 54 and the cover panels 60, 61 are co-planar and completely close the grain tank opening.

An extension control mechanism 65 is provided for extending and closing the extension assembly 5. It comprises an extendible actuator such as an electrical actuator 66 or a hydraulic cylinder which has one end pivotably attached between a pair of ears 67 attached to a slanting rear wall 68 of the grain tank 18. The other end of the actuator 66 is pivotably connected to a reinforcement 70 which is welded to the rear extension panel 58.

The control mechanism 65 further comprises a torque transmission shaft 72 which is mounted in a fore-and-aft direction somewhat below the plane of the grain tank opening. The ends of transmission shaft 72 are rotatably received in lugs 73 extending downwardly from the top of the grain tank 18 as shown in FIGS. 3 and 6. The rear portion of the shaft 72 is provided with a first triangle 75 constituted by a transverse slat 76 perpendicular to the shaft 72 and an inclined slat 77. The outer ends of the slats 76, 77 are bent over and provided with an aperture for receiving a ball joint 79 which is mounted to one end of a pull rod 80. The other end of the pull rod 80 is connected by a further ball joint 81 to a reinforcement profile 83 of the rear extension panel 58.

The front portion of torque transmission shaft 72 is provided with a similar triangle 85 constituted by a transverse slat 86 perpendicular to the shaft 72 and an inclined slat 87. The front slats 86, 87 are somewhat longer than their rear counterparts 76, 77 but they are arranged in the same plane extending through the shaft 72. At their outer ends the front slats 86, 87 are bent over and hold a ball joint 79 which is connected to the lower end of a thrust rod 90. The upper end of the rod 90 is connected by a ball joint 81 to a reinforcement profile 92 which is welded to the inside of the front extension panel 57.

Figure 8:
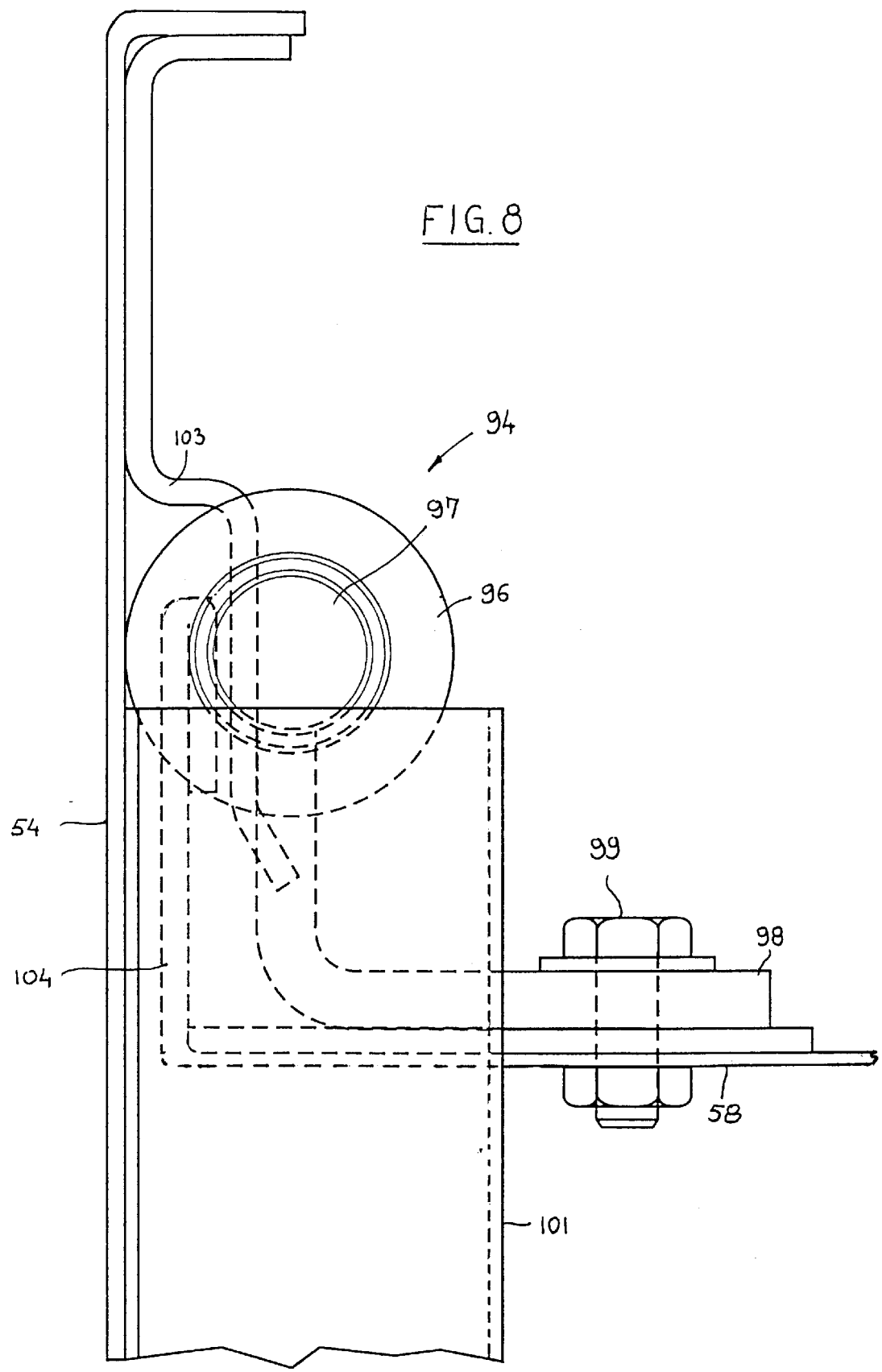
FIG. 8 is a view of a rear corner of the extension taken in the direction of arrow VIII in FIG. 7.
Figure 9:
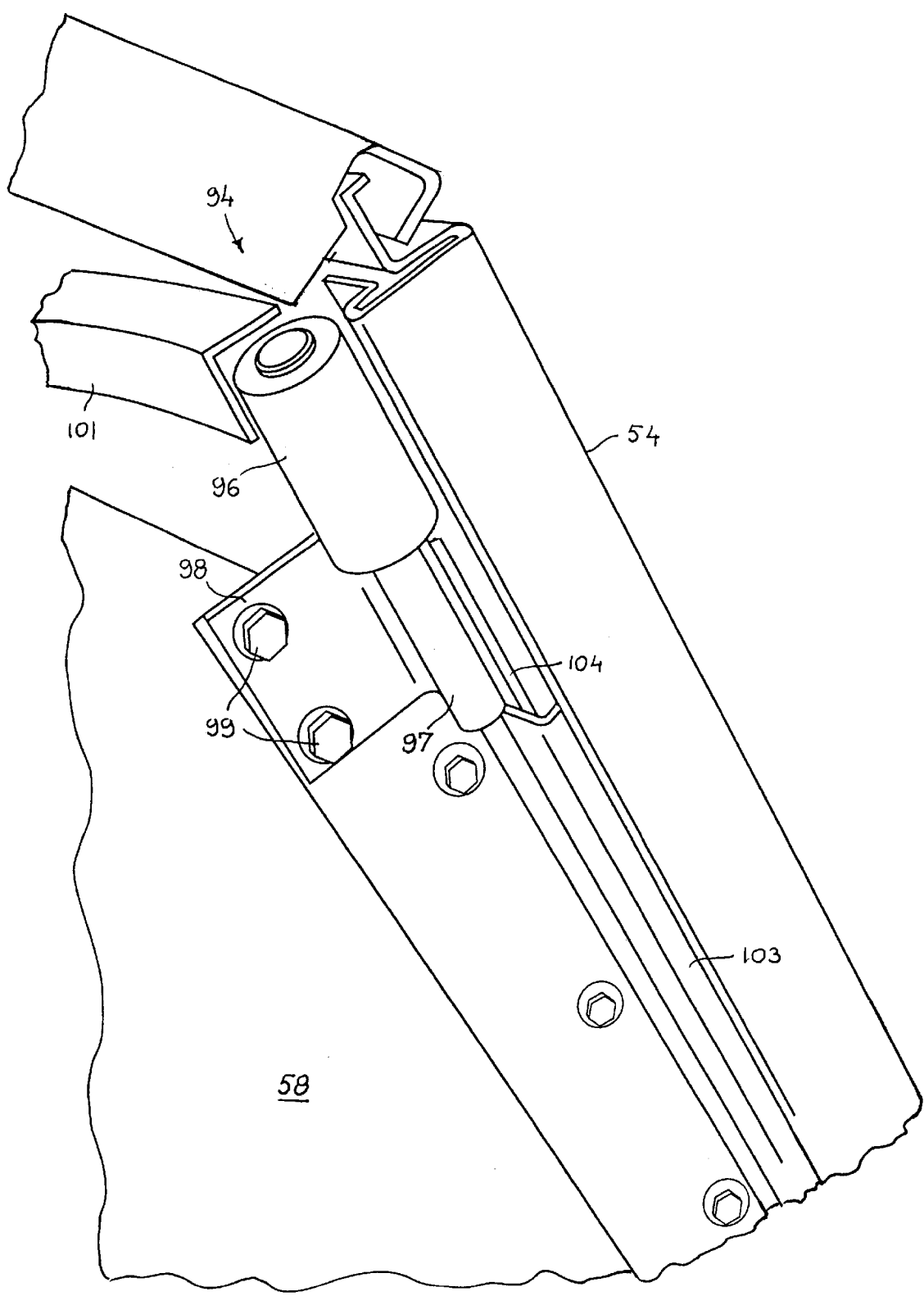
FIG. 9 is a perspective view of the corner of FIG. 8.

The upper corners of the front and rear panels 57, 58 are provided with a glide means 94 for facilitating the movement of the corners along the side panels 53, 54 during extension of the grain tank 18. As shown in FIGS. 8 and 9, the glide means 94 comprises a cylindrical roller 96 made out of a suitable synthetic material, such as polyamide, which is mounted for rotation on a pin 97 extending from an angled support plate 98. A pair of bolt and nut connections 99 attach the support plate 98 to the outside of the front and rear panels 57, 58. The roller 96 extends parallel to and slightly outwardly of the slanted side of the end panel 57 or 58 such that it may contact the inside of the adjacent side panel 53, 54 during the movement of the extension assembly 50 between its collapsed and erected positions.

The top of the roller 96 is received between the inside of the adjacent side panel 53, 54 and a curved guide profile 101 which is welded to the side panel along the trajectory of the roller top. The guide profiles 101 and the glide means 94 ensure that the side panels 53, 54 do not let get loose while the front and rear panels 57 are pivoted upwardly or downwardly.

As illustrated by FIGS. 8 and 9, the side panels 53, 54 are provided with retainer means in the form of front and rear retainer profiles 103, which are welded alongside the front and rear ends of the panels. The inner portion of the profiles 103 provide an elongated catch for an outwardly bent side border 104 of the front or rear panel 57, 58. When the extension assembly 50 is fully erected, the borders 104 hook behind the retainer profiles 103 and prevent further outward movement of the end panels 57, 58. Furthermore, the position of the borders 104 behind the profiles 103 also retains the side panels 53, 54 such that the latter cannot be pushed outwardly by the pressure of the collected grain or by the action of the wind.

In their collapsed position, the end panels 57, 58 are shielded by the side panels 53, 54 and the cover panels 61, 62 and rest on top of the transmission shaft 72 as shown in FIGS. 3 and 4. The actuator 66 is retracted, thereby retaining the rear panel 58. The pull rod 80 has rotated the rear triangle 75 and the shaft 72 counter clock wise (CCW) as seen in FIG. 4. The front triangle 85 extends in the same plane as the rear triangle and pulls on the thrust rod 90 to load the top of the front panel 57 against the transmission shaft 72. The side panels 53, 54 and the cover panels 61, 62 rest on top of the laid-down end panels 57, 58. Appropriate means may be provided to connect the top panels 53, 54, 61, 62 to the border of the grain tank 8.

When the operator wishes to extend the volume of the grain tank 18, he extends the actuator 66 to raise the rear panel 58. Concurrently the pull rod 80 which is attached to the inside of the panel 58 lifts the outer end of the rear triangle 75, thereby rotating the torque transmission shaft 72 clockwise as seen in FIG. 7. The front triangle 85 rotates concurrently and loads the thrust rod 90 to pivot the front panel 57 upwardly. The rollers 96 on the corners of the end panels 57, 58 travel along the guide profiles 101 and push the side panels 53, 54 upwardly and outwardly. During this movement the top of the rollers 96 remains hooked behind the profile 101 such that the side panels 53, 54 cannot get detached from the end panels 57, 58.

Because of the greater length of the transverse and inclined slats 86, 67 of the front triangle 94, the first panel to reach its upright position is the front panel 57. The left and right borders 104 of this panel hook behind the retainer profiles 103 at the front ends of the side panels 53, 54 and prevent further movement of the front panel 57 before the actuator 66 is fully extended and the rear panel 58 has reached its erected position. Further extension of the actuator 66 rotates the rear panel 58 outwardly further and makes the pull rod 80 apply a torsion on the torque transmission shaft 72. The front triangle 85 and the thrust rod 90 thereby load the front panel 57 in an outward direction to keep it in permanent engagement with the retainer profiles 103.

Finally the borders 104 of the rear panel contact the retainer profiles 103 at the rear portion of the side panels 53, 54 and are loaded against by the actuator 66. In this manner all four corners of the extension assembly 50 are firmly secured.

During extension of the assembly 50, the cover panels 60, 61 are pulled sideways by the opening side panels 53, 54 and lifted by the top border of the end panels 57, 58. The inner border of the cover panels 60, 61 may be provided with a wear strip along which this top border slides. Alternatively, the wear strip may be applied to the top border of the end panels 57, 58 themselves. Such strips may be made out of a suitable plastic, e.g. polyamide or polyurethane.

As shown in FIG. 5, a flexible strip 106 is connected between the inner borders of the cover panels 60, 61. This strip 106 is stretched when the extension assembly 50 is fully erected. This prevents that the cover panels 60, 61 are turned over by gusts of wind and the contents of the grain tank 18 are exposed to adverse weather conditions. In the closed position of the extension assembly 50, the strip 106 dangles in the grain tank 18 below the panels 60, 61.

In order to take maximum advantage of the increased volume of the grain tank 18, the clean grain from the cleaning assembly 17 has to discharged at a level above the top of the proper grain tank. Therefore the combine harvester 10 is provided with a two-part bubble-up auger 45 constituted by a lower, stationary auger portion 109, which receives clean grain from the grain elevator 44, and a movable auger portion 110. As shown in FIG. 3, the stationary auger portion 109 comprises an auger tube 112 extending through the rear wall 68 of the grain tank 18. The top of the tube 112 is provided with a pair of generally forwardly extending ears 113. The movable auger portion 110 has an auger tube 115 of the same cross section as the stationary auger tube 112 and which is provided with a pair of ears 116 which are pivotably linked to the stationary ears 113. The pivot axis for the movable auger portion 110 extending through the pivotal connection of the ears 113, 116, lies in a substantially vertical plane which is transverse to the combine harvester 10.

The movable auger portion is connected by a pull rod 118 to the rear panel 58. The pull rod 118 is provided with two ball joints 119 of which one is screwed in a bracket 121 on the movable auger tube 115 and the other through the reinforcement 70 of the rear panel 58. Extending the actuator 66 to raise the extension panels 53, 54, 57 and 58, simultaneously raises the movable auger portion 110 to its active position, with the discharge end above the level of closed grain tank 18. When the actuator 66 is retracted to fold down the extension assembly 50, the auger portion 110 is pivoted forwardly and downwardly by the rod 118, such that the extension panels can be aligned on top of the grain tank.

The grain tank 18 is provided with at least one conventional level indicator which signals to the operator that a predetermined filling level has been achieved. This indicator signal is fed to the controller such as a micro-processor, controlling the extension or retraction of the actuator 66. When the level indicator senses a high grain tank level, the controller prevents retraction of the actuator and closing of the extension assembly 50 until the grain level has fallen sufficiently low to permit safe lowering of the panels 53, 54, 57 and 58.

The foregoing description illustrates a particular embodiment of the invention; however, concepts, as based upon the description may be employed in other embodiments without departing from the scope of the invention as defined in the claims.

For instance it is conceivable to provide the extension assembly with an extension control mechanism comprising a plurality of actuators. It is also conceivable to use an extension assembly wherein the side panels are lodged below the end plates and wherein the control mechanism acts on one of the side panels to extend the full assembly. In this case the transmission shaft extends transversely of the grain tank, between the two side panels and the side panels lock into the end panels.

The locking means 103, 104 need not extend over the full height of the panels. They may be replaced with hooks of short height. The glide means 94 may comprise members such as a low friction pad, attached to the border of the panels, instead of the roller 96.

What is claimed is:

1. An agricultural harvesting machine, comprising:

a wheeled main frame;

means for collecting and processing crop material from a field;

a storage tank affixed to said main frame for storing therein said processed crop material;

extension means associated with said storage tank and comprising a first pair of mutually opposed panels and a second pair of mutually opposed panels, said first and said second pair of panels being movable between a lower, inoperative position and a higher, operative position in which said panels substantially increase the effective volume of said storage tank, the movement of the second pair being controllable by the movement of the first pair and said panels of said first and second pairs are provided with locking means for keeping all panels in their operative position, said locking means being disposed to become engaged and to secure the panels in their operative position when said first pair of panels moves the second pair of panels to their operative position, the panels of said first and second pair are hingeably connected by their lower edges to a quadrangular opening of said grain tank; and the panels of said first pair have members disposed for engaging the inner surface of the panels of the second during the movement between said operative and said inoperative positions, said panels of said second pair are provided with means for keeping said members in engagement with said inner surface during the movement between said operative and said inoperative positions, wherein:

said members are constituted by rollers which are mounted for rotation adjacent corners of said panels of said first pair; and said keeping means are constituted by profiles which are affixed to said inner surface along the path of said rollers.

2. The agricultural harvesting machine described in claim 1, further comprising a transmission means for transmitting the movement of one panel of said first pair of panels upon the other panel of said first pair.

3. The agricultural harvesting machine described in claim 2, further comprising an actuator acting on said one panel of said first pair of panels.

4. The agricultural harvesting machine described in claim 3, wherein said transmission means comprises a torque transmission shaft extending for rotation between said one panel and said other panel, a pull rod connecting said shaft to said one panel, and a thrust rod connecting said shaft to said other panel.

5. The agricultural harvesting machine described in claim 4, further comprising a controller for controlling the movement of said panels between said operative and inoperative positions and a level indicator generating a signal indicative of a predetermined crop level in said storage tank; and said controller is operable to prevent movement of said panels to said inoperative position when said level indicator senses a crop level above said predetermined crop level.

6. The agricultural harvesting machine described in claim 1, further comprising:

a processed crop elevator, comprising an elevator portion which is movable between an operative position in which its outlet lies above the level of said quadrangular opening and an inoperative position below the level of said opening; and means connecting said movable elevator portion to at least one panel of said first pair of panels.

* * * * *